United States Patent
Yu et al.

(10) Patent No.: US 10,348,616 B2
(45) Date of Patent: Jul. 9, 2019

(54) PACKET TRANSMISSION METHOD AND APPARATUS, AND INTERCONNECT INTERFACE

(71) Applicant: Huawei Technologies Co., Ltd., Shenzhen (CN)

(72) Inventors: Donghao Yu, Xi'an (CN); Chenghong He, Shenzhen (CN); Yong Liu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 260 days.

(21) Appl. No.: 15/289,246

(22) Filed: Oct. 10, 2016

(65) Prior Publication Data

US 2017/0026280 A1    Jan. 26, 2017

Related U.S. Application Data (63) Continuation of application No. PCT/CN2014/088961, filed on Oct. 20, 2014.

(30) Foreign Application Priority Data

May 6, 2014    (CN) .......................... 2014 1 0189288

(51) Int. Cl.
*H04L 12/703* (2013.01)
*H04L 12/707* (2013.01)
(Continued)

(52) U.S. Cl.
CPC ................ *H04L 45/28* (2013.01); *H04L 1/18* (2013.01); *H04L 1/189* (2013.01); *H04L 1/1874* (2013.01); *H04L 45/22* (2013.01); *H04L 45/74* (2013.01)

(58) Field of Classification Search
CPC ....... H04L 45/28; H04L 41/0654–0672; H04L 1/18; H04L 1/1874; H04L 1/189
(Continued)

(56) References Cited

U.S. PATENT DOCUMENTS 6,160,808 A * 12/2000 Maurya .................. H04L 29/06
370/389
2002/0186659 A1   12/2002 Hazama
(Continued)

FOREIGN PATENT DOCUMENTS

CN    101277269 A    10/2008
CN    102082696 A     6/2011
(Continued)

OTHER PUBLICATIONS

Machine Translation and Abstract of Chinese Publication No. CN101277269, Oct. 1, 2008, 6 pages.
(Continued)

*Primary Examiner* — Paul H Masur
(74) *Attorney, Agent, or Firm* — Conley Rose, P.C.

(57) ABSTRACT

A packet transmission method, packet transmission apparatus, and an interconnect interface are presented, where the method includes determining, by a sending node, whether an unrecoverable failure occurs in an active link, and if an unrecoverable failure occurs in the active link, selecting, from multiple communication links, at least one standby link except the active link to send a packet to a receiving node, so that the receiving node sends the packet to a receive end of the active link. In the method, for two nodes in an interconnect system that communicate with each other using multiple Links, when it is determined that an unrecoverable failure occurs in some of the Links, packets in retransmission buffers of transmit ends of the links in which the failure is unrecoverable are sent to a standby link.

20 Claims, 6 Drawing Sheets

(51) Int. Cl.
*H04L 1/18* (2006.01)
*H04L 12/741* (2013.01)

(58) Field of Classification Search
USPC .................................................. 370/216, 225
See application file for complete search history.

(56) References Cited

U.S. PATENT DOCUMENTS

| | | | | |
|---|---|---|---|---|
| 2003/0031307 | A1* | 2/2003 | Khadri | H04Q 3/0025 379/221.1 |
| 2006/0187841 | A1* | 8/2006 | Palmer | H04L 1/1867 370/236 |
| 2007/0133397 | A1* | 6/2007 | Bianchi | H04J 3/14 370/225 |
| 2009/0059928 | A1* | 3/2009 | Enomoto | H04L 1/1841 370/394 |
| 2009/0086735 | A1* | 4/2009 | Tsang | H04L 1/1874 370/394 |
| 2010/0142368 | A1* | 6/2010 | Gunukula | H04J 3/14 370/217 |
| 2013/0003549 | A1* | 1/2013 | Matthews | H04L 41/0668 370/235 |
| 2013/0179746 | A1* | 7/2013 | Hamada | H04L 25/4908 714/748 |
| 2014/0050078 | A1* | 2/2014 | Sato | H04L 41/0654 370/228 |
| 2014/0376364 | A1* | 12/2014 | Franzon | G06F 11/2007 370/228 |
| 2015/0372903 | A1* | 12/2015 | Hui | H04L 29/14 370/218 |

FOREIGN PATENT DOCUMENTS

| | | |
|---|---|---|
| CN | 103746912 A | 4/2014 |
| CN | 103957155 A | 7/2014 |

OTHER PUBLICATIONS

Machine Translation and Abstract of Chinese Publication No. CN103957155, Jul. 30, 2014, 4 pages.
Foreign Communication From a Counterpart Application, European Application No. 14891176.1, Extended European Search Report dated Mar. 1, 2017, 6 pages.
Foreign Communication From a Counterpart Application, PCT Application No. PCT/CN2014/088961, English Translation of International Search Report dated Jan. 28, 2015, 2 pages.
Foreign Communication From a Counterpart Application, PCT Application No. PCT/CN2014/088961, English Translation of Written Opinion dated Jan. 28, 2015, 8 pages.

* cited by examiner

PACKET TRANSMISSION METHOD AND APPARATUS, AND INTERCONNECT INTERFACE

CROSS-REFERENCE TO RELATED APPLICATIONS

This application is a continuation of International Application No. PCT/CN2014/088961, filed on Oct. 20, 2014, which claims priority to Chinese Patent Application No. 201410189288.1, filed on May 6, 2014, both of which are hereby incorporated by reference in their entireties

TECHNICAL FIELD

The present disclosure relates to communications technologies, and in particular, to a packet transmission method and apparatus, and an interconnect interface.

BACKGROUND

With an increasingly strong demand for performance of a computing system in the market, a scale of the computing system becomes larger. Computing nodes in the computing system generally interconnect with each other using various types of interconnect interfaces. To adapt to importance of a service borne in the computing system, complexity of an interconnect protocol, and the like, in addition to meeting performance such as high bandwidth and low delay, an interconnect interface used in the computing system needs to have high reliability.

Figure 1:
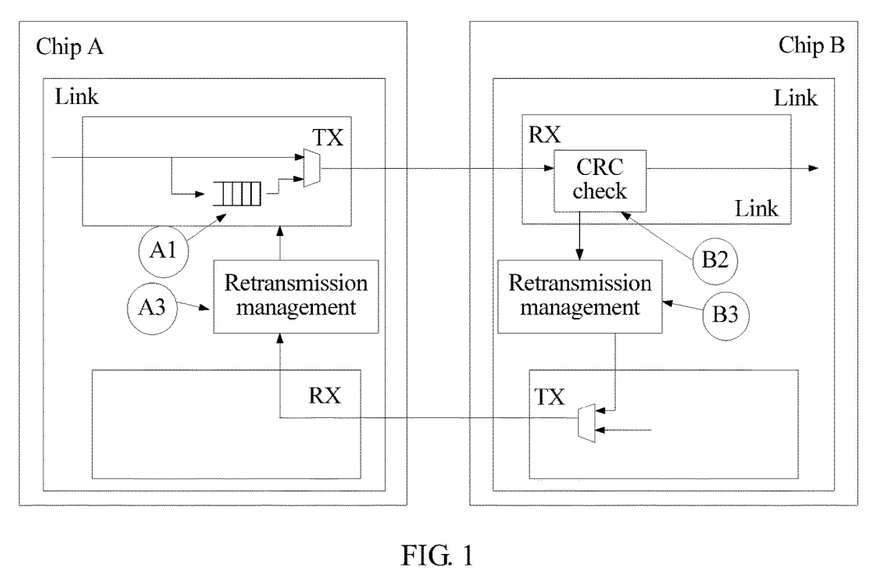
FIG. 1 is a schematic structural diagram of a retransmission manner of a retransmission Buffer in the prior art.

In the prior art, high reliability of an interconnect interface is generally ensured using a retransmission buffer retransmission technology. FIG. 1 is a schematic structural diagram of a retransmission manner of a retransmission Buffer in the prior art. As shown in FIG. 1, bidirectional communication is performed between chip A and chip B using a link. For example, chip A sends a packet to chip B. A transmit (TX) end of the link uses component A1 as a retransmission Buffer to back up the sent packet; component B2 is responsible for performing a cyclic redundancy check (CRC) on the received packet, and sending a check result (whether the packet is correctly received) to component B3; component B3 is a retransmission management module of chip B, and is used to maintain a to-be-received pointer (reptr), where the pointer is 0 after link initialization is completed, the reptr is increased by 1 each time one packet is correctly received, and after a maximum depth of the retransmission Buffer is reached, the pointer is reset to 0 for restarting accumulation. The Reptr pointer always points to a location of a next to-be-received packet in the retransmission Buffer of chip A. Component B3 is further used to initiate a retransmission request to chip A after a packet for which a CRC is incorrect is received, where the retransmission request carries a reptr recorded in chip B. Component A3 is a retransmission management module of chip A, and is responsible for driving, after receiving a retransmission request packet, a TX port to send to chip B again, a packet starting from an address of the reptr, so as to complete a retransmission procedure. For a packet for which a CRC check is correct, chip B adds acknowledgment information to a packet sent by a TX end of the chip B and sends the packet to chip A. Chip A releases corresponding space in the retransmission Buffer after receiving the acknowledgment information, so as to form a head pointer (hptr) in the retransmission Buffer to indicate an oldest address that has not been released in the retransmission Buffer.

However, the foregoing retransmission Buffer retransmission technology only assures a scenario in which a recoverable failure occasionally occurs in a link. In a scenario in which an unrecoverable failure occurs in a link, a system is suspended because a packet in the retransmission Buffer is not acknowledged by a counterpart. The system can continue to work only after the failure is manually removed and the link is reconnected, which cannot ensure reliability of an interconnect system.

SUMMARY

Embodiments of the present disclosure provide a packet transmission method and apparatus, and an interconnect interface, to implement sending a residual packet in a retransmission Buffer of a Link in which a failure is unrecoverable using another standby link, so as to ensure high reliability of an interconnect system.

According to a first aspect, an embodiment of the present disclosure provides a packet transmission method, including determining, by a sending node, whether an unrecoverable failure occurs in an active link, where the active link is any one of multiple communication links between the sending node and a receiving node; if the sending node determines that an unrecoverable failure occurs in the active link, selecting, by the sending node from the multiple communication links, at least one standby link except the active link; and sending, by the sending node, a packet to the receiving node using the standby link, so that the receiving node sends the packet to a receive end of the active link, where the packet is a packet in a retransmission buffer of a transmit end of the active link.

In a first possible implementation manner of the first aspect, after the determining, by a sending node, whether an unrecoverable failure occurs in an active link, and before selecting the standby link from the multiple communication links, the method further includes stopping, by the sending node, sending a service packet using the active link, where the service packet is a packet between the sending node and the receiving node.

With reference to the first aspect or the first possible implementation manner of the first aspect, in a second possible implementation manner of the first aspect, before the sending, by the sending node, a packet to the receiving node using the standby link, the method further includes setting, by the sending node, a channel between the transmit end of the active link and a transmit end of the standby link; and the sending, by the sending node, a packet to the receiving node using the standby link includes sending, by the sending node through the channel, a packet from the active link to the standby link.

With reference to the first aspect, or the first or the second possible implementation manner of the first aspect, in a third possible implementation manner of the first aspect, the packet in the retransmission buffer of the transmit end of the active link includes a backup start packet, a residual packet in the retransmission Buffer, and a backup end packet, where the backup start packet carries an identity of the active link and a head pointer hptr in the retransmission Buffer, and when an address corresponding to the head pointer hptr is behind an address corresponding to the backup end packet, it indicates that the receiving node completely receives the packet in the retransmission buffer; and the sending, by the sending node, a packet to the receiving node using the standby link includes sequentially sending, by the sending node using the standby link, the backup start packet, the residual packet, and the backup end packet.

With reference to the first aspect, or the first, the second, or the third possible implementation manner of the first aspect, in a fourth possible implementation manner of the first aspect, the standby link includes a valid link directly connecting the sending node and the receiving node, or a valid link connecting the sending node and the receiving node using a third node, where the third node is another node except the sending node and the receiving node.

With reference to the first aspect, or the first, the second, the third, or the fourth possible implementation manner of the first aspect, in a fifth possible implementation manner of the first aspect, either of the active link and the standby link includes multiple serializer/deserializer (SerDes) interfaces, multiple source synchronization interfaces, or multiple low-speed parallel interfaces.

According to a second aspect, an embodiment of the present disclosure provides a packet transmission method, including receiving, by a receiving node, a packet sent by a sending node using a standby link, where the packet is a packet in a retransmission buffer of a transmit end of an active link; the active link is any one of multiple communication links between the sending node and the receiving node; and the standby link is at least one another link in the multiple communication links except the active link; and sending, by the receiving node, the packet from the standby link to a receive end of the active link.

In a first possible implementation manner of the second aspect, before the sending, by the receiving node, the packet to the receive end of the active link, the method further includes setting, by the receiving node, a channel between a receive end of the standby link and the receive end of the active link; and the sending, by the receiving node, the packet to the receive end of the active link includes sending, by the receiving node, the packet to the receive end of the active link through the channel.

With reference to the second aspect or the first possible implementation manner of the second aspect, in a second possible implementation manner of the second aspect, the packet in the retransmission buffer of the transmit end of the active link includes a backup start packet, a residual packet in the retransmission Buffer, and a backup end packet, where the backup start packet carries an identity of the active link and a head pointer hptr in the retransmission Buffer; the receiving, by a receiving node, a packet sent by a sending node using a standby link includes sequentially receiving the backup start packet, the residual packet, and the backup end packet; and the sending, by the receiving node, the packet to the receive end of the active link includes sequentially sending, by the receiving node, the backup start packet, the residual packet, and the backup end packet to the receive end of the active link.

With reference to the second possible implementation manner of the second aspect, in a third possible implementation manner of the second aspect, the backup start packet further carries the head pointer hptr in the retransmission Buffer, and after the sequentially sending, by the receiving node, the backup start packet, the residual packet, and the backup end packet to the receive end of the active link, the method further includes determining, by the receiving node according to the hptr, a packet corresponding to a to-be-received pointer reptr of the receive end of the active link, where a packet following the packet corresponding to the to-be-received pointer reptr is a packet in the retransmission buffer.

With reference to the second possible implementation manner of the second aspect, in a fourth possible implementation manner of the second aspect, after the receiving a packet sent using a standby link, the method further includes the backup start packet further carries the head pointer hptr in the retransmission Buffer, and after the receiving, by a receiving node, a packet sent by a sending node using a standby link, the method further includes backing up, by the receiving node, the packet in a retransmission Buffer of a transmit end of the standby link; and determining, by the receiving node according to the head pointer hptr, whether an address for storing the backup end packet is released, and if the address is released, determining that the receive end of the active link has already completely and correctly received the residual packet, where when an address corresponding to the head pointer hptr is behind an address corresponding to the backup end packet, it indicates that the receiving node has already completely and correctly received the packet in the retransmission buffer.

With reference to the second aspect, or any one of the first to the fourth possible implementation manners of the second aspect, in a fifth possible implementation manner of the second aspect, the standby link includes a valid link directly connecting the sending node and the receiving node, or a valid link connecting the sending node and the receiving node using a third node, where the third node is another node except the sending node and the receiving node.

With reference to the second aspect, or any one of the first to the fifth possible implementation manners of the second aspect, in a sixth possible implementation manner of the second aspect, either of the active link and the standby link includes multiple SerDes interfaces, multiple source synchronization interfaces, or multiple low-speed parallel interfaces.

According to a third aspect, an embodiment of the present disclosure provides a packet transmission apparatus, including a determining module configured to determine whether an unrecoverable failure occurs in an active link, where the active link is any one of multiple communication links between the sending node and a receiving node; a selection module configured to, if the determining module determines that an unrecoverable failure occurs in the active link, select, from the multiple communication links, at least one standby link except the active link; and a sending module configured to send a packet using the standby link selected by the selection module, so that the receiving node sends the packet to a receive end of the active link, where the packet is a packet in a retransmission buffer of a transmit end of the active link.

In a first possible implementation manner of the third aspect, the apparatus further includes a stopping module configured to, after the determining module determines that an unrecoverable failure occurs in the active link, and before the selection module selects the standby link from the multiple communication links, stop sending a service packet using the active link, where the service packet is a packet between the sending node and the receiving node.

With reference to the third aspect or the first possible implementation manner of the third aspect, in a second possible implementation manner of the third aspect, the apparatus further includes a setting module configured to, before the sending module sends the packet to the receiving node using the standby link, set a channel between the transmit end of the active link and a transmit end of the standby link; and the sending module is configured to send, in the sending node through the channel set by the setting module, a packet from the active link to the standby link.

With reference to the third aspect, or the first or the second possible implementation manner of the third aspect, in a third possible implementation manner of the third aspect, the packet in the retransmission buffer of the transmit end of the active link includes a backup start packet, a residual packet in the retransmission Buffer, and a backup end packet, where the backup start packet carries an identity of the active link and a head pointer hptr in the retransmission Buffer, and when an address corresponding to the head pointer hptr is behind an address corresponding to the backup end packet, it indicates that the receiving node completely receives the packet in the retransmission buffer; and the sending module is configured to sequentially send, using the standby link, the backup start packet, the residual packet, and the backup end packet.

With reference to the third aspect, or the first, the second, or the third possible implementation manner of the third aspect, in a fourth possible implementation manner of the third aspect, the standby link includes a valid link directly connecting the sending node and the receiving node, or a valid link connecting the sending node and the receiving node using a third node, where the third node is another node except the sending node and the receiving node.

With reference to the third aspect, or the first, the second, the third, or the fourth possible implementation manner of the third aspect, in a fifth possible implementation manner of the third aspect, either of the active link and the standby link includes multiple SerDes interfaces, multiple source synchronization interfaces, or multiple low-speed parallel interfaces.

According to a fourth aspect, an embodiment of the present disclosure provides a packet transmission apparatus, including a receiving module configured to receive a packet sent by a sending node using a standby link, where the packet is a packet in a retransmission buffer of a transmit end of an active link; the active link is any one of multiple communication links between the sending node and a receiving node; and the standby link is at least one another link in the multiple communication links except the active link; and a sending module configured to send, in the receiving node from the standby link to a receive end of the active link, the packet received by the receiving module.

In a first possible implementation manner of the fourth aspect, the apparatus further includes a setting module configured to, before the sending module sends the packet to the receive end of the active link, set a channel between a receive end of the standby link and the receive end of the active link; and the sending module is configured to send the packet to the receive end of the active link through the channel set by the setting module.

With reference to the fourth aspect or the first possible implementation manner of the fourth aspect, in a second possible implementation manner of the fourth aspect, the packet in the retransmission buffer of the transmit end of the active link includes a backup start packet, a residual packet in the retransmission Buffer, and a backup end packet, where the backup start packet carries an identity of the active link and a head pointer hptr in the retransmission Buffer; the receiving module is configured to sequentially receive the backup start packet, the residual packet, and the backup end packet; and the sending module is configured to sequentially send, to the receive end of the active link, the backup start packet, the residual packet, and the backup end packet that are received by the receiving module.

With reference to the second possible implementation manner of the fourth aspect, in a third possible implementation manner of the fourth aspect, the apparatus further includes a determining module configured to, after the sending module sequentially sends the backup start packet, the residual packet, and the backup end packet to the receive end of the active link, determine, according to the hptr, a packet corresponding to a to-be-received pointer reptr of the receive end of the active link, where a packet following the packet corresponding to the to-be-received pointer reptr is a packet in the retransmission buffer.

With reference to the second possible implementation manner of the fourth aspect, in a fourth possible implementation manner of the fourth aspect, the apparatus further includes a processing module configured to, after the receiving module receives the packet sent by the sending node using the standby link, back up the packet in a retransmission Buffer of a transmit end of the standby link; and determine, according to the head pointer hptr, whether an address for storing the backup end packet is released, and if the address is released, determine that the receive end of the active link has already completely and correctly received the residual packet, where when an address corresponding to the head pointer hptr is behind an address corresponding to the backup end packet, it indicates that the receiving node has already completely and correctly received the packet in the retransmission buffer.

With reference to the fourth aspect, or any one of the first to the fourth possible implementation manners of the fourth aspect, in a fifth possible implementation manner of the fourth aspect, the standby link includes a valid link directly connecting the sending node and the receiving node, or a valid link connecting the sending node and the receiving node using a third node, where the third node is another node except the sending node and the receiving node.

With reference to the fourth aspect, or any one of the first to the fifth possible implementation manners of the fourth aspect, in a sixth possible implementation manner of the fourth aspect, either of the active link and the standby link includes multiple SerDes interfaces, multiple source synchronization interfaces, or multiple low-speed parallel interfaces.

According to a fifth aspect, an embodiment of the present disclosure provides an interconnect interface, including the packet transmission apparatus according to the foregoing third aspect, or any one of the first to the fifth possible implementation manners of the third aspect, and the packet transmission apparatus according to the foregoing fourth aspect, or any one of the first to the sixth possible implementation manners of the fourth aspect.

According to the packet transmission method and apparatus, and the interconnect interface provided in the embodiments of the present disclosure, for two nodes in an interconnect system that communicate with each other using multiple Links, when it is determined that an unrecoverable failure occurs in some of the Links, packets in retransmission buffers of transmit ends of the links in which the failure is unrecoverable are sent to a standby link, so that these packets are sent, using the standby link, to receive ends of the links in which the failure is unrecoverable, which greatly improves a capability of the interconnect system in preventing a sudden abnormal case, and ensures high reliability of the interconnect system. In addition, this process may be completed automatically by hardware without any extra software overhead or consumption of extra resources.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 2:
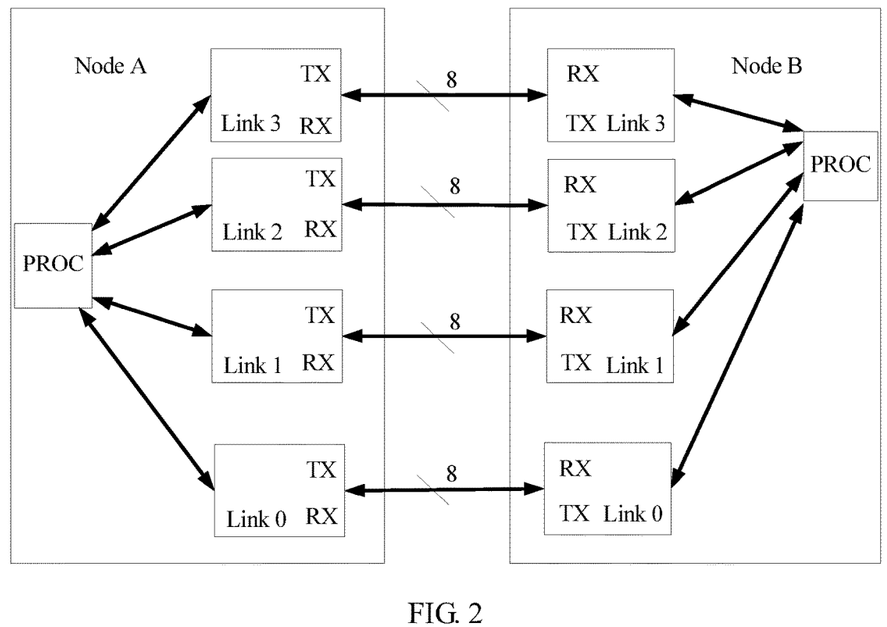
FIG. 2 is a schematic diagram of a first architecture of an interconnect system to which a packet transmission method is applicable according to the present disclosure.

Generally, there are multiple nodes in an interconnect system, such as a computing node and a storage node. Nodes are connected to each other using an interconnect interface, where the interconnect interface may be, for example, a SerDes interface, a source synchronization interface, or a low-speed parallel interface, which is not limited in the present disclosure. To increase system bandwidth, multiple interconnect interfaces form one Link. For example, one Link is formed by multiple SerDes interfaces, and each Link may be an X4 link (X4 indicates that one Link is formed by four SerDes, and so on), an X8 link, or an X12 link. However, in this manner in which one Link is formed by binding multiple SerDes interfaces, there is a need to ensure that the SerDes interfaces are strictly equal in length, and bandwidth cannot be increased by limitlessly increasing a line width of the Link. In the embodiments of the present disclosure, to further increase system bandwidth, there may be multiple Links between any two nodes. For details, refer to FIG. 2. FIG. 2 is a schematic diagram of a first architecture of an interconnect system to which a packet transmission method is applicable according to the present disclosure.

As shown in FIG. 2, there are four Links (Link0-Link3) between node A and node B. For example, each Link may be formed by a group of X8 SerDes interfaces interconnected with each other using an optical fiber, and the four Links share a bandwidth requirement between node A and node B. Each of node A and node B has a process (PROC) module. The PROC module represents a module at an application/protocol layer, and is configured to, when the node properly works, send generated packets to transmit (TX) ends of the four Links, and receive packets received by receive (RX) ends of the Links.

Referring to FIG. 2, node A communicates with node B. When node A sends a packet to node B, node A is a sending node, and node B is a receiving node; when node B sends a packet to node A, node B is a sending node, and node A is a receiving node. A sending node and a receiving node are merely two relative concepts. For example, node A sends a packet to node B. When an unrecoverable failure occurs in any quantity of Links; for example, when an unrecoverable failure such as accidental removal of an optical fiber occurs in Link3, because there is no retransmission mechanism at a protocol layer of a communications protocol, if a retransmission Buffer retransmission technology in the prior art is used, a residual packet in a retransmission Buffer of Link3 cannot be sent to a receive end of Link3 in node B. Link3 of node B initiates retransmission only after the optical fiber is reconnected, so as to obtain the residual packet that has already been in the retransmission Buffer of Link3 of node A.

In view of the above, the embodiments of the present disclosure provide a packet transmission method with dynamic mutual backup of multiple Links, which ensures that, in a normal case, the Links share a bandwidth requirement of an entire system. When an unrecoverable failure occurs in a Link, a residual packet in a retransmission Buffer of the faulty Link is sent to a receive end using another standby link, so as to ensure high reliability of an interconnect system. For details, refer to FIG. 3.

Figure 3:
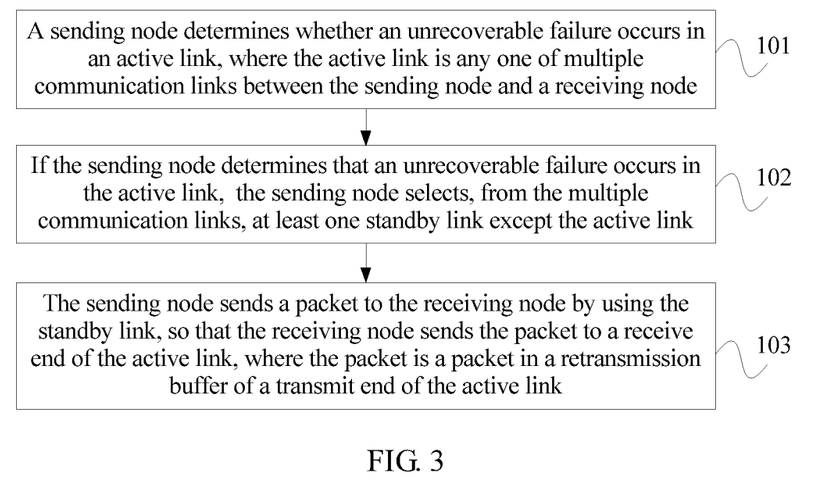
FIG. 3 is a flowchart of a first embodiment of a packet transmission method according to the present disclosure.

FIG. 3 is a flowchart of a first embodiment of a packet transmission method according to the present disclosure. In this embodiment, the present disclosure is described in detail from a perspective of a sending node. This embodiment of the present disclosure is applicable to a scenario in which an unrecoverable failure occurs in some Links between any two nodes in an interconnect system, and real-time quality and reliability of the interconnect system need to be ensured. In this embodiment, node A is a sending node, and node B is a receiving node. This embodiment includes the following steps.

Step 101. The sending node determines whether an unrecoverable failure occurs in an active link, where the active link is any one of multiple communication links between the sending node and the receiving node.

It may be learned with reference to FIG. 2 that there may be multiple channel links, that is, multiple Links between the sending node and the receiving node. Whether an unrecoverable failure occurs in a Link is determined by a state machine of the Link. In this step, a state machine (not shown in the figure) of each Link of node A determines whether an unrecoverable failure occurs in the corresponding Link, that is, whether a failure that cannot be recovered by the link occurs, for example, a failure such as removal of an optical fiber. For clear description, in the following, a link in which an unrecoverable failure occurs is referred to as an active link.

Step 102. If the sending node determines that an unrecoverable failure occurs in the active link, the sending node selects, from the multiple communication links, at least one standby link except the active link.

The sending node may configure, by default, a Link as a standby link in advance, and ensure that the standby link is always in a valid state; or may select at least one Link from multiple valid Links as a standby link according to a priority, a load condition, and the like, and send, to the standby link, a residual packet in a retransmission Buffer of a link in which an unrecoverable failure occurs.

Step 103. The sending node sends a packet to the receiving node using the standby link, so that the receiving node sends the packet to a receive end of the active link, where the packet is a packet in a retransmission buffer of a transmit end of the active link.

Using a priority as an example, it is assumed that priorities of Link0-Link3 as standby links are Link3, Link2, Link1, and Link0 successively. When determining, in step 102, that an unrecoverable failure occurs in a Link such as Link3, node A uses Link2 as a standby link, and sends a packet in a retransmission Buffer of Link3 to Link2, so that on the receiving node, Link2 sends the received packet to a receive end of Link3. In this process, an operating time starting from detecting that an unrecoverable failure occurs in a link to completing backup is less than 1 ms, and therefore a user does not perceive occurrence of the failure at all.

Likewise, when it is determined that an unrecoverable failure occurs in at least one Link in step 102, these faulty Links may also be sorted according to a priority, a load condition, importance of a packet, and the like, and a standby link is selected for each Link according to the sorting. Using importance of a packet as an example, it is assumed that importance of Link0-Link3 according to importance of packets carried is successively Link0, Link1, Link2, and Link3, and priorities of Link0-Link3 as standby links are Link3, Link2, Link1, and Link0 successively. When it is determined that an unrecoverable failure occurs in Link0 and Link3, a standby link Link2 is first selected for Link0, and a standby link Link0 is then selected for Link3; or Link2 is used as a standby link of Link0 and Link3, and after a residual packet in a retransmission Buffer of Link0 is completely sent, a residual packet in a retransmission Buffer of Link3 is then sent to Link2.

According to the packet transmission method provided in this embodiment of the present disclosure, for two nodes in an interconnect system that communicate with each other using multiple Links, when determining that an unrecoverable failure occurs in some of the Links, a sending node selects a standby link, and sends, using the standby link, packets in retransmission buffers of transmit ends of the links in which the failure is unrecoverable to receive ends of the links in which the failure is unrecoverable, which greatly improves a capability of the interconnect system in preventing a sudden abnormal case, and ensures high reliability of the interconnect system. In addition, this process may be completed automatically by hardware without any extra software overhead or consumption of extra resources.

Figure 4:
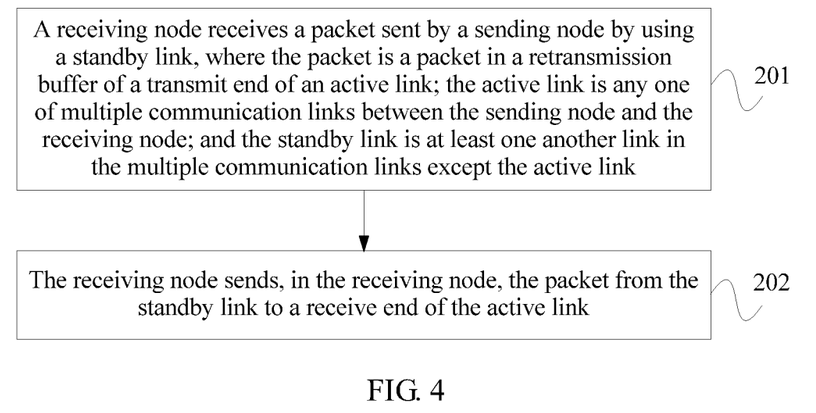
FIG. 4 is a flowchart of a second embodiment of a packet transmission method according to the present disclosure.

FIG. 4 is a flowchart of a second embodiment of a packet transmission method according to the present disclosure. In this embodiment, the present disclosure is described in detail from a perspective of a receiving node. This embodiment of the present disclosure is applicable to a scenario in which an unrecoverable failure occurs in some Links between any two nodes in an interconnect system, and real-time quality and reliability of the interconnect system need to be ensured. In this embodiment, node A is a sending node, and node B is a receiving node. This embodiment includes the following steps.

Step 201. The receiving node receives a packet sent by the sending node using a standby link, where the packet is a packet in a retransmission buffer of a transmit end of an active link; the active link is any one of multiple communication links between the sending node and the receiving node; and the standby link is at least one another link in the multiple communication links except the active link.

In this step, for concepts related to the active link and the like, refer to step 101 in FIG. 3, and details are not described herein again.

Step 202. The receiving node sends, in the receiving node, the packet from the standby link to a receive end of the active link.

Refer to FIG. 2 at the same time. For example, an unrecoverable failure occurs in Link3, and Link2 is a standby link. Link3 of node A sends residual packets in a retransmission Buffer of a transmit end of Link3 to a transmit end of Link2, and the transmit end of Link2 sends these residual packets to a receive end of Link2. In this way, the residual packets can be sent from node A to node B. Then, in node B, the receive end of Link2 further sends the received packets to a receive end of Link3.

According to the packet transmission method provided in this embodiment of the present disclosure, for two nodes in an interconnect system that communicate with each other using multiple Links, when determining that an unrecoverable failure occurs in some of the Links, a sending node sends, to a standby link, packets in retransmission buffers of transmit ends of the links in which the failure is unrecoverable; correspondingly, a receiving node receives these packets, and sends these packets to receive ends of the links in which the failure is unrecoverable, which greatly improves a capability of the interconnect system in preventing a sudden abnormal case, and ensures high reliability of the interconnect system. In addition, this process may be completed automatically by hardware without any extra software overhead or consumption of extra resources.

In the foregoing FIG. 3 and FIG. 4, the present disclosure is described in detail separately from a perspective of a sending node and a perspective of a receiving node. The following describes the present disclosure in detail from a perspective of interaction between a sending node and a receiving node.

Figure 5:
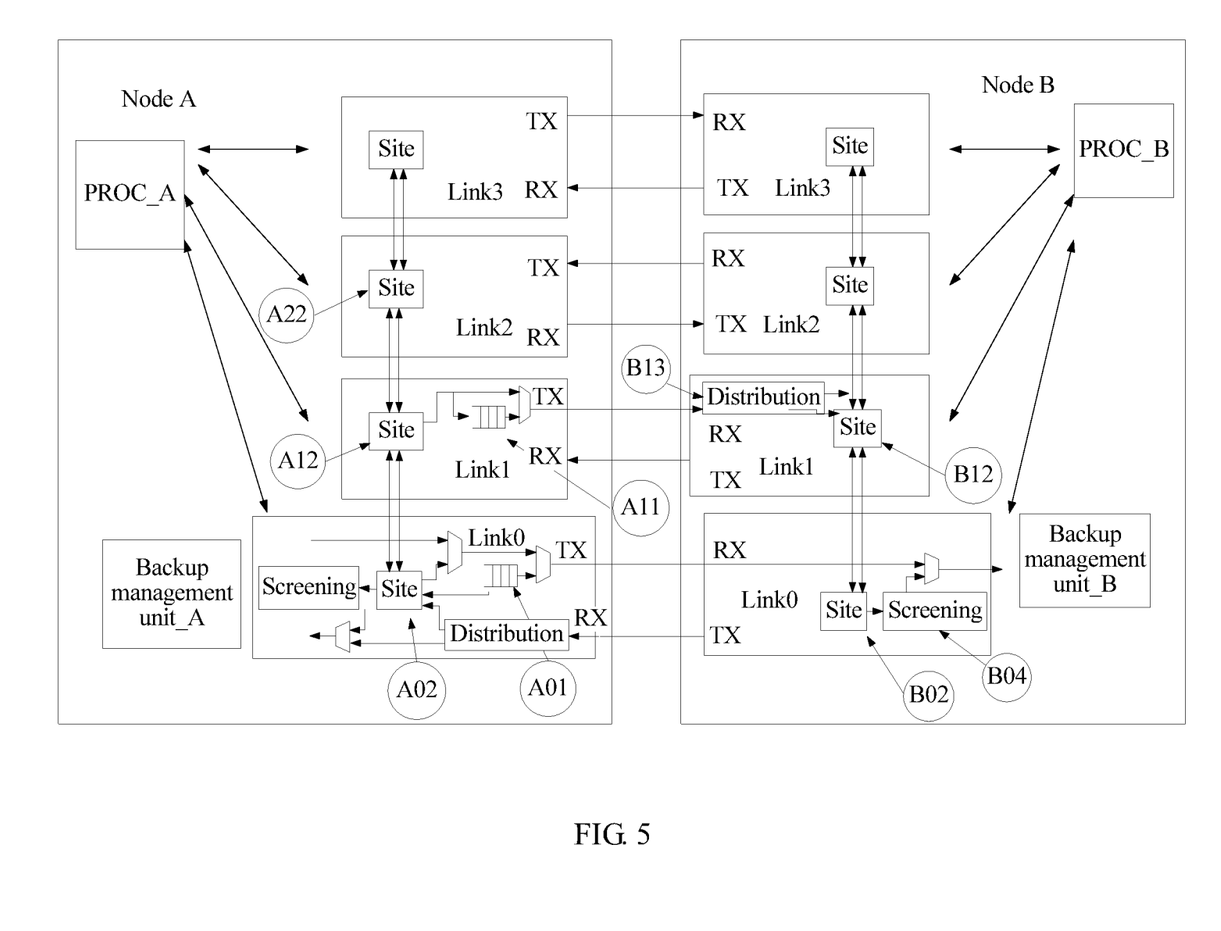
FIG. 5 is a schematic diagram of a second architecture of an interconnect system to which a packet transmission method is applicable according to the present disclosure.

FIG. 5 is a schematic diagram of a second architecture of an interconnect system to which a packet transmission method is applicable according to the present disclosure. As shown in FIG. 5, there are four Links (Link0-Link3) between node A and node B. When an unrecoverable failure occurs in Link0 between node A and node B, that is, when Link0 is an active link, using an example in which node A sends a packet to node B, detailed descriptions of components in a packet transmission process provided in this embodiment of the present disclosure are as follows:

PROC_A module: a PROC module of node A, where the PROC module represents a module at an application/protocol layer, and is configured to, when the node properly works, send generated packets to TX ends of the four Links, and receive packets received by receive (Receive, RX) ends of the Links;

PROC_B module: a PROC module of node B, where the PROC module represents a module at an application/protocol layer, and is configured to, when the node properly works, send generated packets to TX ends of the four Links, and receive packets received by RX ends of the Links;

Link module: each of node A and node B has Link0-Link3 modules, where a transmit end of Link0 of node A is connected to a receive end of Link0 of node B, a receive end of Link0 of node A is connected to a transmit end of a Link0 of node B, and so on; in addition, each Link module has a site unit, a screening unit, a distribution unit, a retransmission Buffer, and the like;

A01: a retransmission Buffer of Link0 of node A;

A02: a site unit of Link0 of node A, where each Link of each node has a respective site unit, and all the site units may form a bidirectional channel by means of connection, so that all the Links interconnect with each other;

A11: a retransmission Buffer of Link1 of node A;

A12: a site unit of Link1 of node A;

A22: a site unit of Link2 of node A;

B02: a site unit of Link0 of node B;

B04: a screening unit of Link0 of node B configured to select, according to a reptr recorded by B04, a location to start receiving a packet, where the packet is a packet that is forwarded using a standby Link and that is in a retransmission Buffer of Link0;

B12: a site unit of Link1 of node B;

B13: a distribution unit of Link1 of node B configured to, when Link1 is used as a standby link, distribute, to the site unit B12, a packet that is in received packets and that belongs to a Link in which a failure is unrecoverable;

backup management unit A: a backup management unit of node A;

backup management unit B: a backup management unit of node B.

In a third embodiment of the packet transmission method in the present disclosure, with reference to FIG. 5, when an unrecoverable failure occurs in Link0 between node A and node B, using an example in which node A sends a packet to node B, a packet transmission process provided in this embodiment of the present disclosure is as follows.

Step 1: A failure occurs in a physical link of Link0.

Step 2: After a state machine of Link0 of node A detects that an unrecoverable failure occurs in the link, stop the PROC_A module from continuing to send a new packet to a TX end of Link0, and send a backup request to the backup management unit A to request the backup management unit A to transmit a packet in a retransmission Buffer of the active link Link0 using another Link.

Step 3: After receiving the backup request of the active link Link0, the backup management unit A selects, for the active link Link0, a valid Link as a standby link of Link0. A procedure for selecting the standby link includes the following steps.

Step 3.1: The backup management unit A waits for a backup request sent by a Link in which an unrecoverable failure occurs.

Step 3.2: The backup management unit A determines whether a backup request sent by a Link is received; if a backup request is received, performs step 3.3, and otherwise, goes back to step 3.1 to continue to wait for a backup request.

Step 3.3: The backup management unit A determines whether there is a valid link between node A and node B; if there is a valid link, performs step 3.5, and otherwise, performs step 3.4.

Step 3.4: The backup management unit A reports an alarm; then, goes back to step 3.1 to continue to wait for a backup request.

Step 3.5: The backup management unit A selects a standby link for Link0.

In this step, the backup management unit A selects a link from valid links as a standby link of Link0. For a specific selecting process, refer to step 102 in FIG. 3, and details are not described herein again.

Step 4: The backup management unit A sets a channel between the transmit end of Link0 and a transmit end of the standby link.

Refer to FIG. 5 at the same time. Links are connected using site units, and each site unit is connected to a transmit end of a current Link. For clear description, in the following, a channel between Links connected using site units is referred to as a horizontal channel, a channel that connects to each site unit and a transmit end of a current Link is referred to as a current Link transmit channel, and each site unit selects, using a channel selecting switch, to enable the horizontal channel or the current Link transmit channel.

In this step, the backup management unit A enables a channel selecting switch of each site unit according to the selected standby Link. For example, it is assumed that the standby Link selected in step 3.5 is Link1; therefore, in this step, the backup management unit A enables a channel selecting switch of a horizontal channel between A02 and A12, and enables a channel selecting switch of a channel between A12 and a transmit end of Link1, that is, the backup management unit A enables a current Link transmit channel of Link1. For another example, it is assumed that the standby Link selected in step 3.5 is Link2; therefore, in this step, the backup management unit A enables a channel selecting switch of a horizontal channel between A02 and A12 and a channel selecting switch of a horizontal channel between A12 and A22, disables a current Link transmit channel of Link1, and enables a current Link transmit channel of Link2.

Step 5: The backup management unit A instructs the active link Link0 to send the packet in the retransmission Buffer to the standby link.

The backup management unit A instructs the active link Link0 to send the packet in the retransmission Buffer A01 using the set channel, and at the same time, instructs Link1 to stop the PROC_A module from sending a new packet to Link1. In this step, in a sending node, if the standby Link is Link1, a residual packet in the retransmission Buffer A01 of Link0 flows to the site unit A02, flows from A02 to the standby Link, that is, the site unit A12 of Link1, and finally flows from A12 to the transmit end of Link1. For another example, if the standby Link is Link2, a residual packet in the retransmission Buffer A01 flows to the site A02, then flows to the site unit A22 of Link2, and flows from A22 to a transmit end of Link2.

Figure 6:
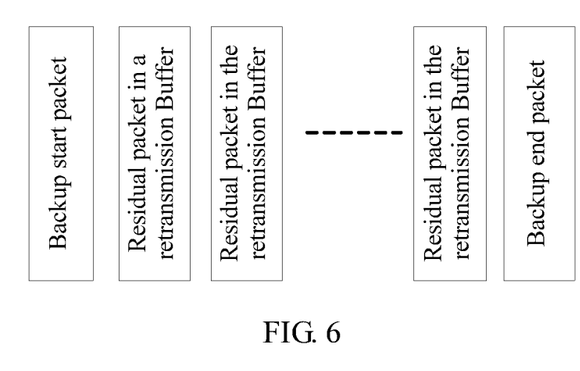
FIG. 6 is a diagram of a packet sending process in a third embodiment of a packet transmission method according to the present disclosure.

In this step, the packet in the retransmission buffer of the transmit end of the active link Link0, that is, Link0 on which a failure is unrecoverable, includes a backup start packet, a residual packet in the retransmission Buffer, and a backup end packet, where the backup start packet carries an identity of Link0 and a head pointer hptr in the retransmission Buffer. In this case, if an unrecoverable failure occurs in the link, the backup start packet, the residual packet, and the backup end packet are sequentially sent to the standby link, and when an address corresponding to the head pointer hptr is behind an address corresponding to the backup end packet, it indicates that a receiving node completely receives the packet in the retransmission buffer. A procedure for sending a packet in a retransmission Buffer is shown in FIG. 6. FIG. 6 is a diagram of a packet sending process in the third embodiment of the packet transmission method according to the present disclosure.

In the following step 6 to step 11, the present disclosure is described in detail using Link1 as a standby Link.

Step 6: The packet in the retransmission Buffer A01 is transmitted to the site unit A12 of Link1 using a horizontal channel, and is sent on the current Link transmit channel of Link1, that is, from a transmit end of Link1; in addition, the packet in the retransmission Buffer A01 is written into the retransmission Buffer A11 of Link1.

Step 7: After a receive end of Link1 of node B receives a backup start packet, the distribution unit B13 of Link1 of node B parses the backup start packet, records this event, and also sets, according to information in the backup start packet, a channel between the receive end of Link1 and the receive end of the active link Link0, that is, the distribution unit B13 enables a current Link transmit channel between B13 and B12, and a horizontal channel between B12 and B02.

Step 8: Link1 of node B sends, to the receive end of Link0 of node B using a path: B13->B12->B02, the packet received by the receive end.

Step 9: The screening unit B04 of Link0 of node B counts, according to a record of a head pointer hptr in the backup start packet, a received residual packet so as to find a packet corresponding to a to-be-received reptr of the screening unit B04, where a packet following the packet corresponding to the to-be-received pointer reptr is a packet in the retransmission buffer; and sends the packet received after the packet corresponding to the to-be-received pointer reptr to the PROC_B module; in this way, the PROC_B module of node B unconsciously receives consecutive correct packets.

Step 10: When receiving a backup end packet, the site unit B02 of node B restores a state of a switch channel of Link1, so that a packet subsequently received by Link1 is a packet that is sent by the PROC_A module and that belongs to Link1.

Step 11: After a backup end packet buffered in the retransmission Buffer A11 of Link1 of node A is released after a normal ACK, that is, after an address of the hptr is behind an address for storing the backup end packet, it indicates that the receive end of Link0 of node B has completely and correctly received all packets in the buffer A01 of the transmit end of Link0 in node A; in this case, Link1 sends, to the backup management unit A, completion indication information to report end of this retransmission procedure.

Figure 7:
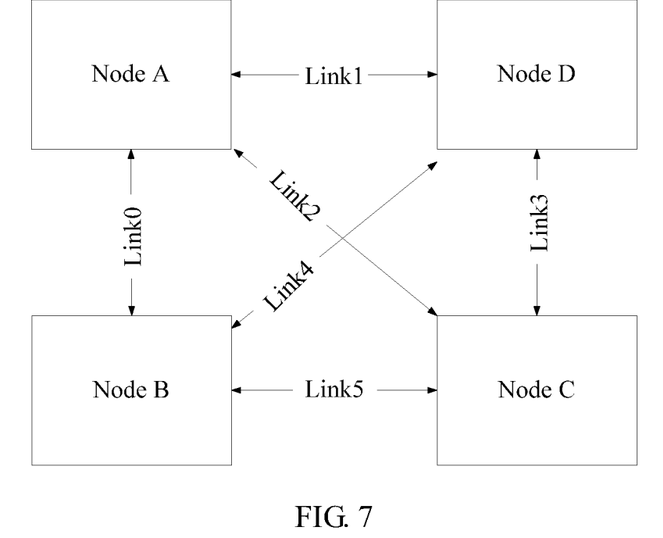
FIG. 7 is a schematic diagram of a third architecture of an interconnect system to which a packet transmission method is applicable according to the present disclosure.

In the interconnect system shown in the foregoing FIG. 2 and FIG. 5, a Link in which an unrecoverable failure occurs is a Link between two directly connected nodes, and a standby link is a valid link directly connecting the sending node and the receiving node. However, the present disclosure is not limited thereto. In another feasible implementation manner, the standby link may also be a valid link connecting the sending node and the receiving node using a third node, where the third node is another node except the sending node and the receiving node. For details, refer to FIG. 7. FIG. 7 is a schematic diagram of a third architecture of an interconnect system to which a packet transmission method is applicable according to the present disclosure.

As shown in FIG. 7, each node has three Links that are respectively connected to the other three nodes. For example, node A has Link0, Link1, and Link2 that are respectively connected to node B, node D, and node C; node B has Link0, Link4, and Link5 that are respectively connected to node A, node D, and node C and so on; the nodes form a fully-interconnected system using these Links. When an unrecoverable failure occurs in Link0 between node A and node B, using an example in which node A sends a packet to node B, a residual packet in a retransmission Buffer of Link0 in node A may be backed up twice using Link1 and Link4 and retransmitted to a receive end of Link0 in node B, or may be backed up three times using Link1, Link3, and Link5 and retransmitted to a receive end of Link0 in node B.

Optionally, the packet transmission method provided in this embodiment of the present disclosure is applicable to an interconnect system that has a requirement for high bandwidth and high data stability, such as a computing system, a storage system, or the like, and is applicable to any interconnect system based on a communications interface protocol without error retransmission at a protocol layer, such as a cache coherence non-uniform memory access (CC-NUMA) system. An interconnect protocol requirement of the CC-NUMA system is as follows: an interconnect interface data link layer needs to ensure complete reliable transmission of a packet. Any error packet and packet loss may probably cause breakdown of an entire system.

Figure 8:
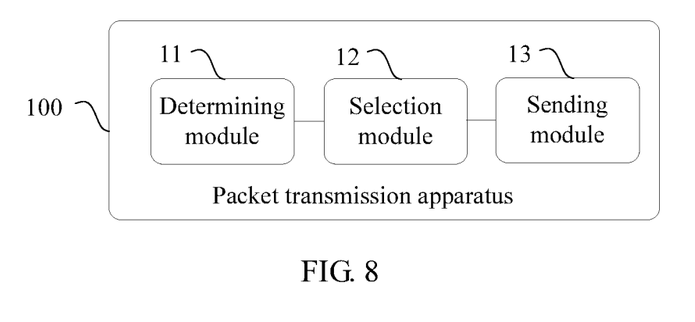
FIG. 8 is a schematic structural diagram of a first embodiment of a packet transmission apparatus according to the present disclosure.

FIG. 8 is a schematic structural diagram of a first embodiment of a packet transmission apparatus according to the present disclosure. The packet transmission apparatus provided in this embodiment is an apparatus embodiment corresponding to the embodiment in FIG. 3 of the present disclosure. A specific implementation process is not repeated herein. A packet transmission apparatus 100 provided in this embodiment includes a determining module 11 configured to determine whether an unrecoverable failure occurs in an active link, where the active link is any one of multiple communication links between the sending node and a receiving node; a selection module 12 configured to, if the determining module 11 determines that an unrecoverable failure occurs in the active link, select, from the multiple communication links, at least one standby link except the active link; and a sending module 13 configured to send a packet using the standby link selected by the selection module 12, so that the receiving node sends the packet to a receive end of the active link, where the packet is a packet in a retransmission buffer of a transmit end of the active link.

According to the packet transmission apparatus provided in this embodiment of the present disclosure, for two nodes in an interconnect system that communicate with each other using multiple Links, when it is determined that an unrecoverable failure occurs in some of the Links, packets in retransmission buffers of transmit ends of the links in which the failure is unrecoverable are sent to a standby link, so that these packets are sent, using the standby link, to receive ends of the links in which the failure is unrecoverable, which greatly improves a capability of the interconnect system in preventing a sudden abnormal case, and ensures high reliability of the interconnect system. In addition, this process may be completed automatically by hardware without any extra software overhead or consumption of extra resources.

Figure 9:
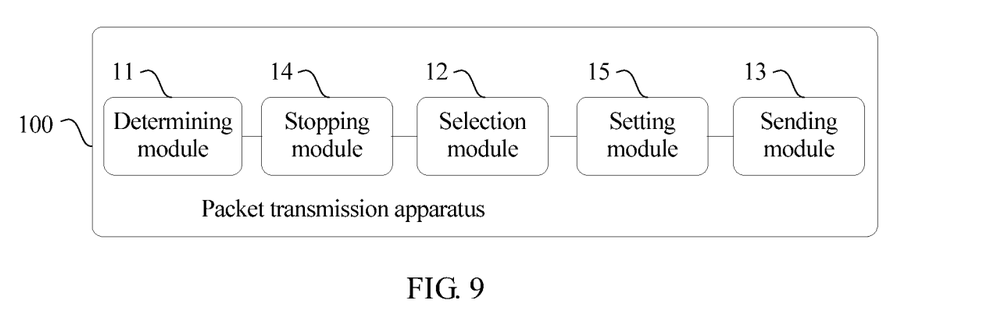
FIG. 9 is a schematic structural diagram of a second embodiment of a packet transmission apparatus according to the present disclosure.

FIG. 9 is a schematic structural diagram of a second embodiment of a packet transmission apparatus according to the present disclosure. As shown in FIG. 9, based on the structure of the apparatus shown in FIG. 8, optionally, the packet transmission apparatus 100 in this embodiment further includes a stopping module 14 configured to, after the determining module 11 determines that an unrecoverable failure occurs in the active link, and before the selection module 12 selects the standby link from the multiple communication links, stop sending a service packet using the active link, where the service packet is a packet between the sending node and the receiving node.

Optionally, referring to FIG. 9 again, the packet transmission apparatus 100 further includes a setting module 15 configured to, before the sending module 13 sends the packet to the receiving node using the standby link, set a channel between the transmit end of the active link and a transmit end of the standby link; and the sending module 13 is configured to send, in the sending node through the channel set by the setting module 15, a packet from the active link to the standby link.

Optionally, in the foregoing embodiment, the packet in the retransmission buffer of the transmit end of the active link includes a backup start packet, a residual packet in the retransmission Buffer, and a backup end packet, where the backup start packet carries an identity of the active link and a head pointer hptr in the retransmission Buffer, and when an address corresponding to the head pointer hptr is behind an address corresponding to the backup end packet, it indicates that the receiving node completely receives the packet in the retransmission buffer; and the sending module 13 is configured to sequentially send, using the standby link, the backup start packet, the residual packet, and the backup end packet.

Optionally, in the foregoing embodiment, the standby link includes a valid link directly connecting the sending node and the receiving node, or a valid link connecting the sending node and the receiving node using a third node, where the third node is another node except the sending node and the receiving node.

Optionally, in the foregoing embodiment, either of the active link and the standby link includes multiple SerDes interfaces, multiple source synchronization interfaces, or multiple low-speed parallel interfaces.

Figure 10:
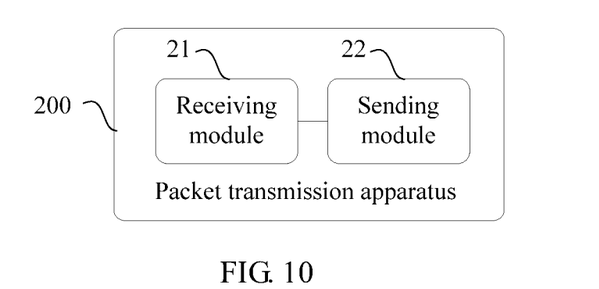
FIG. 10 is a schematic structural diagram of a third embodiment of a packet transmission apparatus according to the present disclosure.

FIG. 10 is a schematic structural diagram of a third embodiment of a packet transmission apparatus according to the present disclosure. The packet transmission apparatus provided in this embodiment is an apparatus embodiment corresponding to the embodiment in FIG. 4 of the present disclosure. A specific implementation process is not repeated herein. A packet transmission apparatus 200 provided in this embodiment includes a receiving module 21 configured to receive a packet sent by a sending node using a standby link, where the packet is a packet in a retransmission buffer of a transmit end of an active link; the active link is any one of multiple communication links between the sending node and a receiving node; and the standby link is at least one another link in the multiple communication links except the active link; and a sending module 22 configured to send, in the receiving node from the standby link to a receive end of the active link, the packet received by the receiving module 21.

According to the packet transmission apparatus provided in this embodiment of the present disclosure, for two nodes in an interconnect system that communicate with each other using multiple Links, when determining that an unrecoverable failure occurs in some of the Links, a sending node sends, to a standby link, packets in retransmission buffers of transmit ends of the links in which the failure is unrecoverable; correspondingly, a receiving node receives these packets, and sends these packets to receive ends of the links in which the failure is unrecoverable, which greatly improves a capability of the interconnect system in preventing a sudden abnormal case, and ensures high reliability of the interconnect system. In addition, this process may be completed automatically by hardware without any extra software overhead or consumption of extra resources.

Figure 11:
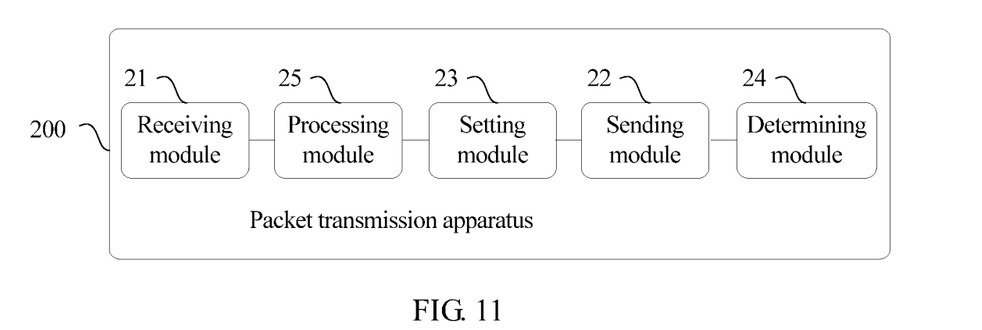
FIG. 11 is a schematic structural diagram of a fourth embodiment of a packet transmission apparatus according to the present disclosure.

FIG. 11 is a schematic structural diagram of a fourth embodiment of a packet transmission apparatus according to the present disclosure. As shown in FIG. 11, based on the structure of the apparatus shown in FIG. 10, optionally, the packet transmission apparatus 200 in this embodiment further includes a setting module 23 configured to, before the sending module 22 sends the packet to the receive end of the active link, set a channel between a receive end of the standby link and the receive end of the active link; and the sending module 22 is configured to send the packet to the receive end of the active link through the channel set by the setting module 23.

Optionally, in the foregoing embodiment, the packet in the retransmission buffer of the transmit end of the active link includes a backup start packet, a residual packet in the retransmission Buffer, and a backup end packet, where the backup start packet carries an identity of the active link and a head pointer hptr in the retransmission Buffer, where the receiving module 21 is configured to sequentially receive the backup start packet, the residual packet, and the backup end packet; and the sending module 22 is configured to sequentially send, to the receive end of the active link, the backup start packet, the residual packet, and the backup end packet that are received by the receiving module 21.

Referring to FIG. 11 again, optionally, the packet transmission apparatus 200 further includes a determining module 24 configured to, after the sending module 22 sequentially sends the backup start packet, the residual packet, and the backup end packet to the receive end of the active link, determine, according to the hptr, a packet corresponding to a to-be-received pointer reptr of the receive end of the active link, where a packet following the packet corresponding to the to-be-received pointer reptr is a packet in the retransmission buffer.

Referring to FIG. 11 again, optionally, the packet transmission apparatus 200 further includes a processing module 25 configured to, after the receiving module 21 receives the packet sent by the sending node using the standby link, determine, according to the head pointer hptr, whether an address for storing the backup end packet is released, and if the address is released, determine that the receive end of the active link has already completely and correctly received the residual packet, where when an address corresponding to the head pointer hptr is behind an address corresponding to the backup end packet, it indicates that the receiving node has already completely and correctly received the packet in the retransmission buffer.

Optionally, in the foregoing embodiment, the standby link includes a valid link directly connecting the sending node and the receiving node, or a valid link connecting the sending node and the receiving node using a third node, where the third node is another node except the sending node and the receiving node.

Optionally, in the foregoing embodiment, either of the active link and the standby link includes multiple SerDes interfaces, multiple source synchronization interfaces, or multiple low-speed parallel interfaces.

Figure 12:
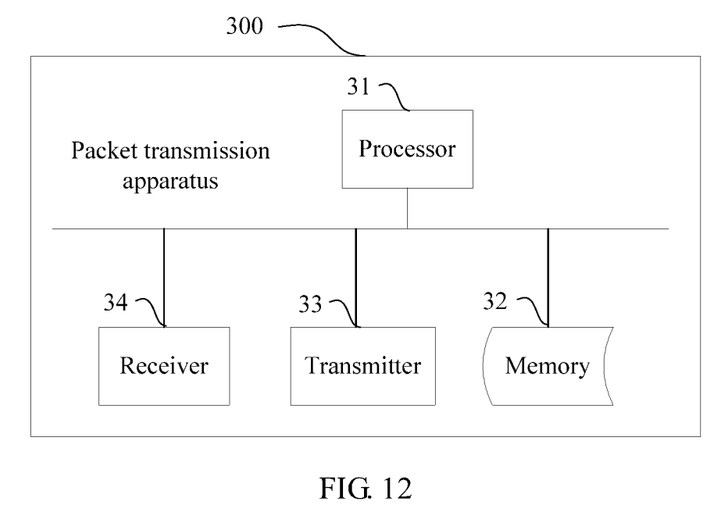
FIG. 12 is a schematic structural diagram of a fifth embodiment of a packet transmission apparatus according to the present disclosure.

FIG. 12 is a schematic structural diagram of a fifth embodiment of a packet transmission apparatus according to the present disclosure. As shown in FIG. 12, a packet transmission apparatus 300 provided in this embodiment includes a processor 31 and a memory 32. The packet transmission apparatus 300 may further include a transmitter 33 and a receiver 34. The transmitter 33 and the receiver 34 may be connected to the processor 31. The transmitter 33 is configured to send data or information, the receiver 34 is configured to receive data or information, and the memory 32 stores an executable instruction. When the packet transmission apparatus 300 runs, the processor 31 communicates with the memory 32, and the processor 31 invokes the executable instruction in the memory 32, so as to execute the method embodiment shown in FIG. 3. Implementation principles and technical effects of the apparatus are similar, and are not repeated herein.

Figure 13:
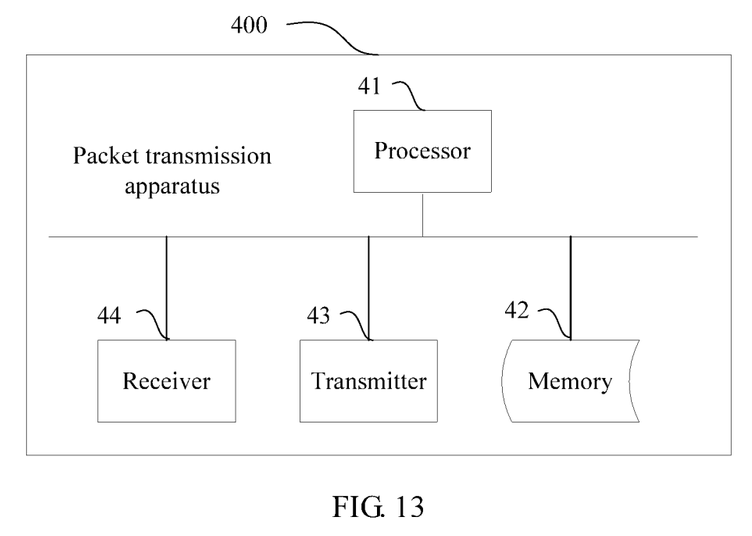
FIG. 13 is a schematic structural diagram of a sixth embodiment of a packet transmission apparatus according to the present disclosure.

FIG. 13 is a schematic structural diagram of a sixth embodiment of a packet transmission apparatus according to the present disclosure. As shown in FIG. 13, a packet transmission apparatus 400 provided in this embodiment includes a processor 41 and a memory 42. The packet transmission apparatus 400 may further include a transmitter 43 and a receiver 44. The transmitter 43 and the receiver 44 may be connected to the processor 41. The transmitter 43 is configured to send data or information, the receiver 44 is configured to receive data or information, and the memory 42 stores an executable instruction. When the packet transmission apparatus 400 runs, the processor 41 communicates with the memory 42, and the processor 41 invokes the executable instruction in the memory 42, so as to execute the method embodiment shown in FIG. 4. Implementation principles and technical effects of the apparatus are similar, and are not repeated herein.

In addition, based on the foregoing packet transmission apparatus, an embodiment of the present disclosure further provides an interconnect interface, including the packet transmission apparatus shown in the foregoing FIG. 8, FIG. 9, or FIG. 12, and the packet transmission apparatus shown in the foregoing FIG. 10, FIG. 11, or FIG. 13. Specific working principles are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A packet transmission method, comprising:
   determining, by a sending node, whether an unrecoverable failure occurs in an active link, the active link being one of a plurality of communication links directly interconnecting the sending node and a receiving node;
   selecting, by the sending node from the plurality of communication links, a standby link in response the unrecoverable failure occurring in the active link, the standby link being one of the plurality of communication links except for the active link that directly interconnects the sending node and the receiving node; and
   sending, by the sending node, a packet to a receive end of the active link at the receiving node using the standby link, the packet being in a retransmission buffer for the active link at the sending node, the retransmission buffer storing copies of a plurality of packets sent by a transmit end of the active link at the sending node.

2. The method according to claim 1, wherein after determining whether the unrecoverable failure occurs in the active link and before selecting the standby link, the method further comprises stopping, by the sending node, sending a service packet using the active link between the sending node and the receiving node.

3. The method according to claim 1, wherein before sending, by the sending node, the packet to the receive end of the active link at the receiving node using the standby link, the method further comprises setting, by the sending node, a channel between the transmit end of the active link at the sending node and a transmit end of the standby link at the sending node, and wherein the packet is sent to the standby link through the channel.

4. The method according to claim 1, wherein the packet in the retransmission buffer of the transmit end of the active link at the sending node comprises:
   a backup start packet;
   a residual packet in the retransmission buffer; and
   a backup end packet, wherein the backup start packet carries an identity of the active link and a head pointer (hptr) in the retransmission buffer,
   wherein a second address corresponding to the hptr is behind a first address corresponding to the backup end packet indicates that the receiving node completely receives the packet, and
   wherein sending, by the sending node, the packet to the receive end of the active link at the receiving node using the standby link comprises sending, by the sending node using the standby link, the backup start packet, the residual packet, and the backup end packet sequentially.

5. A packet transmission method, comprising:
   receiving a packet by a receive end of a standby link at receiving node from a retransmission buffer of a transmit end of an active link at a sending node using the standby link, the retransmission buffer storing copies of a plurality of packets transmitted by the transmit end of the active link, the active link being one of a plurality of communication links directly interconnecting the sending node and the receiving node, and the standby link being one of the plurality of communication links except for the active link that directly interconnects the sending node and the receiving node; and
   sending, by the receiving node, the packet from the receive end of the standby link at the receiving node to a receive end of the active link at the receiving node.

6. The method according to claim 5, wherein before sending, by the receiving node, the packet to the receive end of the active link at the receiving node, the method further comprises setting, by the receiving node, a channel between the receive end of the standby link and the receive end of the active link, and wherein the packet being sent to the receive end of the active link through the channel.

7. The method according to claim 5, wherein the packet in the retransmission buffer of the transmit end of the active link comprises:
   a backup start packet;
   a residual packet in the retransmission buffer; and
   a backup end packet, wherein the backup start packet carries an identity of the active link and a head pointer (hptr) in the retransmission buffer;
   wherein receiving, by the receiving node, the packet comprises sequentially receiving the backup start packet, the residual packet, and the backup end packet, and
   wherein sending, by the receiving node, the packet to the receive end of the active link comprises sequentially sending, by the receiving node, the backup start packet, the residual packet, and the backup end packet to the receive end of the active link.

8. The method according to claim 7, wherein after sequentially sending, by the receiving node, the backup start packet, the residual packet, and the backup end packet to the receive end of the active link, the method further comprises determining, by the receiving node based on the hptr, a first packet corresponding to a to-be-received pointer (reptr) of the receive end of the active link, wherein a second packet following the first packet corresponding to the reptr is in the retransmission buffer.

9. The method according to claim 7, wherein the backup start packet further carries the hptr in the retransmission buffer, and wherein after receiving, by the receiving node, the packet, the method further comprises:
   backing up, by the receiving node, the packet in the retransmission buffer of the transmit end of the standby link;
   determining, by the receiving node based on the hptr, whether an address for storing the backup end packet is released; and
   determining, by the receiving node, that the receive end of the active link has already completely and correctly received the residual packet in response to determining that the address is released, wherein a second address corresponding to the hptr is behind first address corresponding to the backup end packet indicates that the receiving node has already completely and correctly received the packet in the retransmission buffer.

10. A packet transmission apparatus in a sending node, comprising:
    a memory storing executable instructions;
    a processor coupled to the memory and configured to:
      determine whether an unrecoverable failure occurs in an active link, the active link being one of a plurality of communication links directly interconnecting the sending node and a receiving node; and
      select, from the plurality of communication links, a standby link in response the unrecoverable failure occurring in the active link, the standby link being one of the plurality of communication links except for the active link that directly interconnects the sending node and the receiving node; and
    a transmitter coupled to the processor and configured to send a packet to a receive end of the active link at the receiving node using the standby link, the packet being in a retransmission buffer for the active link at the sending node, the retransmission buffer storing copies of a plurality of packets sent by a transmit end of the active link at the sending node.

11. The apparatus according to claim 10, wherein after the processor determines that the unrecoverable failure occurs in the active link and before the processor selects the standby link, the processor is further configured to stop sending a service packet using the active link between the sending node and the receiving node.

12. The apparatus according to claim 10, wherein before the transmitter sends the packet to the receive end of the active link at the receiving node using the standby link, the processor is configured to set a channel between the transmit end of the active link at the sending node and a transmit end of the standby link at the sending node, and wherein the packet is sent to the standby link through the channel.

13. The apparatus according to claim 10, wherein the packet in the retransmission buffer of the transmit end of the active link at the sending node comprises:
    a backup start packet;
    a residual packet in the retransmission buffer; and
    a backup end packet, wherein the backup start packet carries an identity of the active link and a head pointer (hptr) in the retransmission buffer,
    wherein a second address corresponding to the hptr behind a first address corresponding to the backup end packet indicates that the receiving node completely receives the packet in the retransmission buffer, and
    wherein the transmitter is configured to sequentially send, using the standby link, the backup start packet, the residual packet, and the backup end packet.

14. A packet transmission apparatus in a receiving node, comprising:
    a receiver configured to receive a packet by a receive end of a standby link at the receiving node from a retransmission buffer of a transmit end of an active link at a sending node using a standby link, the retransmission buffer storing copies of a plurality of packets transmitted by the transmit end of the active link, the active link being one of a plurality of communication links directly interconnecting the sending node and the receiving node, and the standby link being one of the plurality of communication links except for the active link that directly interconnects the sending node and the receiving node; and
    a transmitter coupled to the receiver and configured to send the packet from the receive end of the standby link at the receiving node to a receive end of the active link at the receiving node.

15. The apparatus according to claim 14, wherein the apparatus further comprises a processor configured to set a channel between the receive end of the standby link and the receive end of the active link before the transmitter sends the packet to the receive end of the active link, the packet being sent to the receive end of the active link through the channel.

16. The apparatus according to claim 14, wherein the packet in the retransmission buffer of the transmit end of the active link comprises:
    a backup start packet;
    a residual packet in the retransmission buffer; and
    a backup end packet, wherein the backup start packet carries an identity of the active link and a head pointer (hptr) in the retransmission buffer,
    wherein the receiver is configured to sequentially receive the backup start packet, the residual packet, and the backup end packet, and
    wherein the transmitter is configured to sequentially send the backup start packet, the residual packet, and the backup end packet to the receive end of the active link.

17. The apparatus according to claim 16, further comprising a processor coupled to the receiver and the transmitter, wherein after the transmitter sequentially sends the backup start packet, the residual packet, and the backup end packet to the receive end of the active link, the processor is configured to determine, based on the hptr, a first packet corresponding to a to-be-received pointer (reptr) of the receive end of the active link, and wherein a second packet following the first packet corresponding to the reptr is in the retransmission buffer.

18. The apparatus according to claim 16, further comprising a processor is configured to:
    back up the packet in the retransmission buffer of the transmit end of the standby link after the receiver receives the packet;
    determine, based on the hptr, whether an address for storing the backup end packet is released; and determine that the receive end of the active link has already completely and correctly received the residual packet in response to determining that the address is released, wherein a second address corresponding to the hptr behind first address corresponding to the backup end packet indicates that the receiving node has already completely and correctly received the packet in the retransmission buffer.

19. The apparatus according to claim 14, wherein the standby link comprises a valid link directly connecting the sending node and the receiving node.

20. The apparatus according to claim 14, wherein either of the active link and the standby link comprises at least one of multiple serializer/deserializer (SerDes) interfaces, multiple source synchronization interfaces, or multiple low-speed parallel interfaces.

* * * * *